(12) United States Patent
Zimmer

(10) Patent No.: US 6,622,339 B1
(45) Date of Patent: Sep. 23, 2003

(54) WINDSHIELD WIPER ARM

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/762,460

(22) PCT Filed: May 25, 2000

(86) PCT No.: PCT/DE00/01694

§ 371 (c)(1),
(2), (4) Date: Feb. 7, 2001

(87) PCT Pub. No.: WO01/00464

PCT Pub. Date: Jan. 4, 2001

(30) Foreign Application Priority Data

Jun. 28, 1999 (DE) .......................... 199 29 494
Feb. 16, 2000 (DE) .......................... 100 06 850

(51) Int. Cl.⁷ .................................. B60S 1/32
(52) U.S. Cl. ..................... 15/250.201; 15/250.351
(58) Field of Search .................. 15/250.351, 250.352, 15/250.201, 250.44, 250.43

(56) References Cited

U.S. PATENT DOCUMENTS 3,673,631 A * 7/1972 Yamadai et al. ....... 15/250.201
5,903,953 A    5/1999 Dimur et al.

FOREIGN PATENT DOCUMENTS

| DE | 39 23 623 A |   | 1/1990  |                |
|----|-------------|---|---------|----------------|
| DE | 41 42 163 A |   | 7/1992  |                |
| DE | 19528015    | * | 10/1996 | ...... 15/250.201 |
| EP | 490833      | * | 6/1992  | ...... 15/250.351 |
| EP | 538093      | * | 4/1993  | ...... 15/250.351 |
| EP | 549396      | * | 6/1993  | ...... 15/250.201 |
| FR | 1258911     | * | 3/1961  | ...... 15/250.352 |
| FR | 2 632 897 A |   | 12/1989 |                |
| FR | 2660267     | * | 10/1991 | ...... 15/250.351 |
| GB | 2207342     | * | 2/1989  | ...... 15/250.35 |

* cited by examiner

*Primary Examiner*—Gary K. Graham
(74) *Attorney, Agent, or Firm*—Michael J. Striker

(57) ABSTRACT

A windshield wiper for motor vehicle, having a drivably supported wiper arm that carries a wiper blade, wherein the wiper arm at least partly surrounds the wiper blade and is formed by a substantially U-shaped profiled part, characterized in that one leg pointing substantially in a travel direction of the vehicle forms an integrated spoiler, and at least one air outflow opening is disposed in an area of further legs, the one leg has a spoiler lip pointing in a direction of the window to be wiped, and the spoiler lip comprises an elastic material.

2 Claims, 6 Drawing Sheets

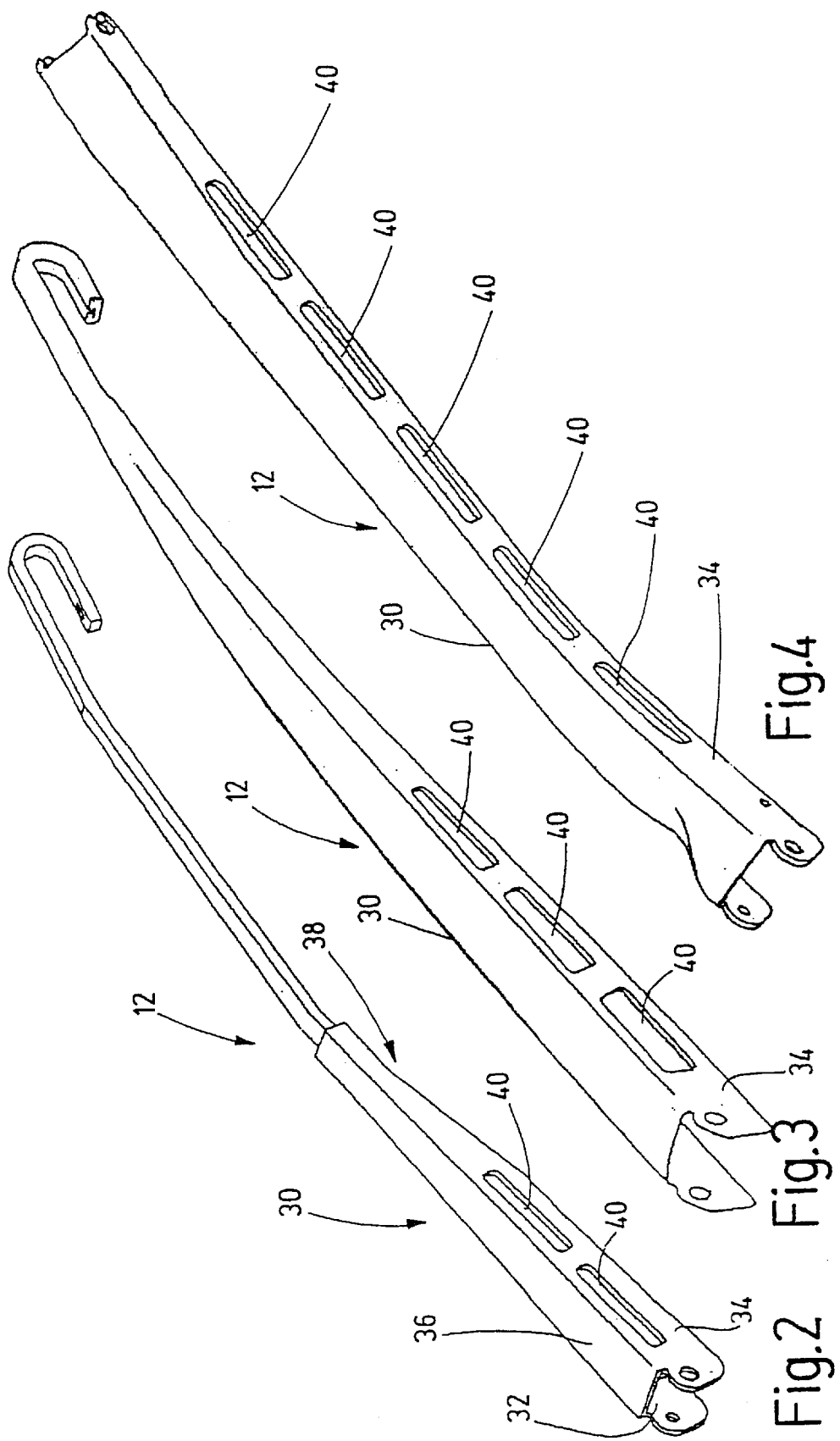

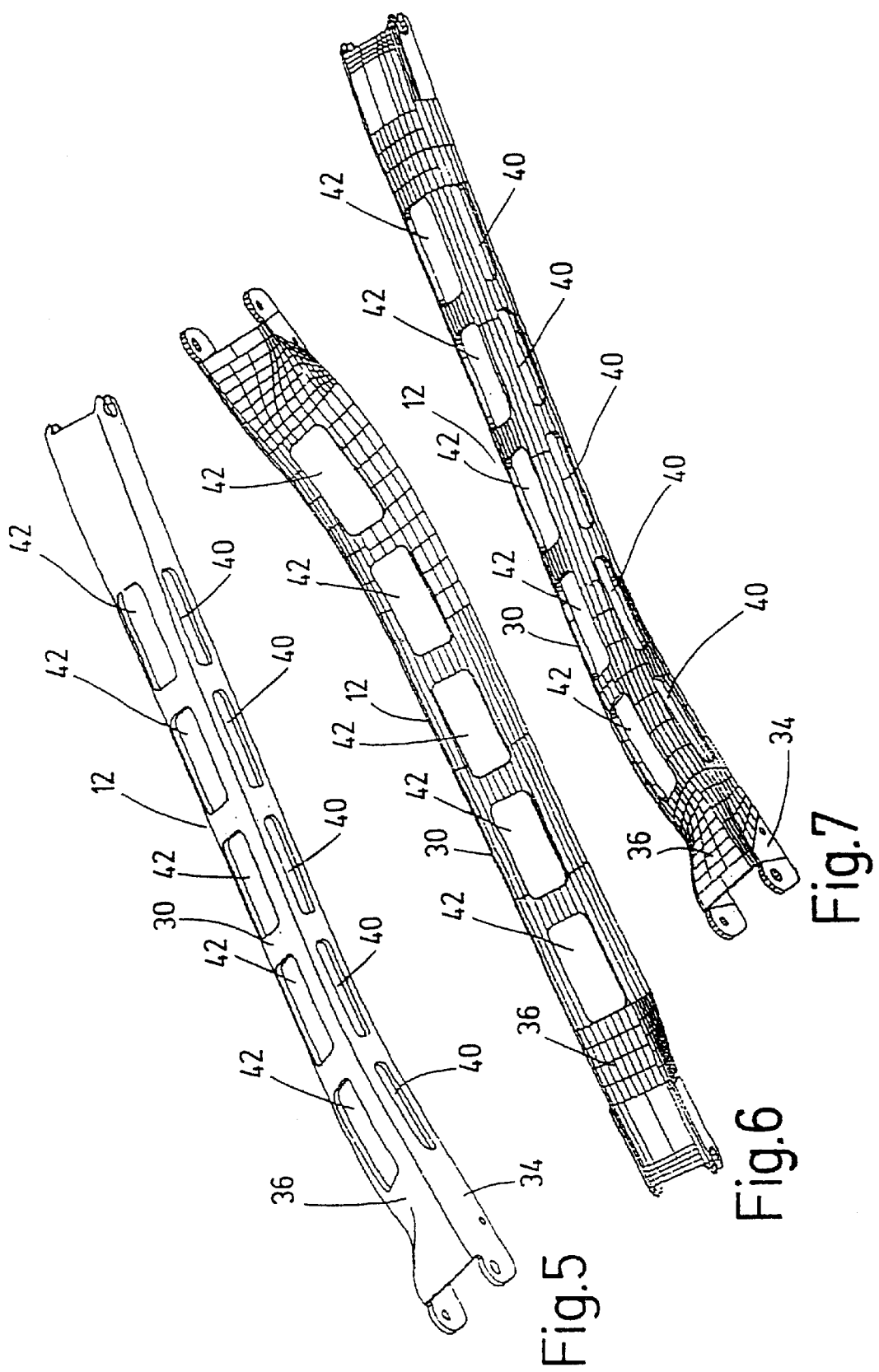

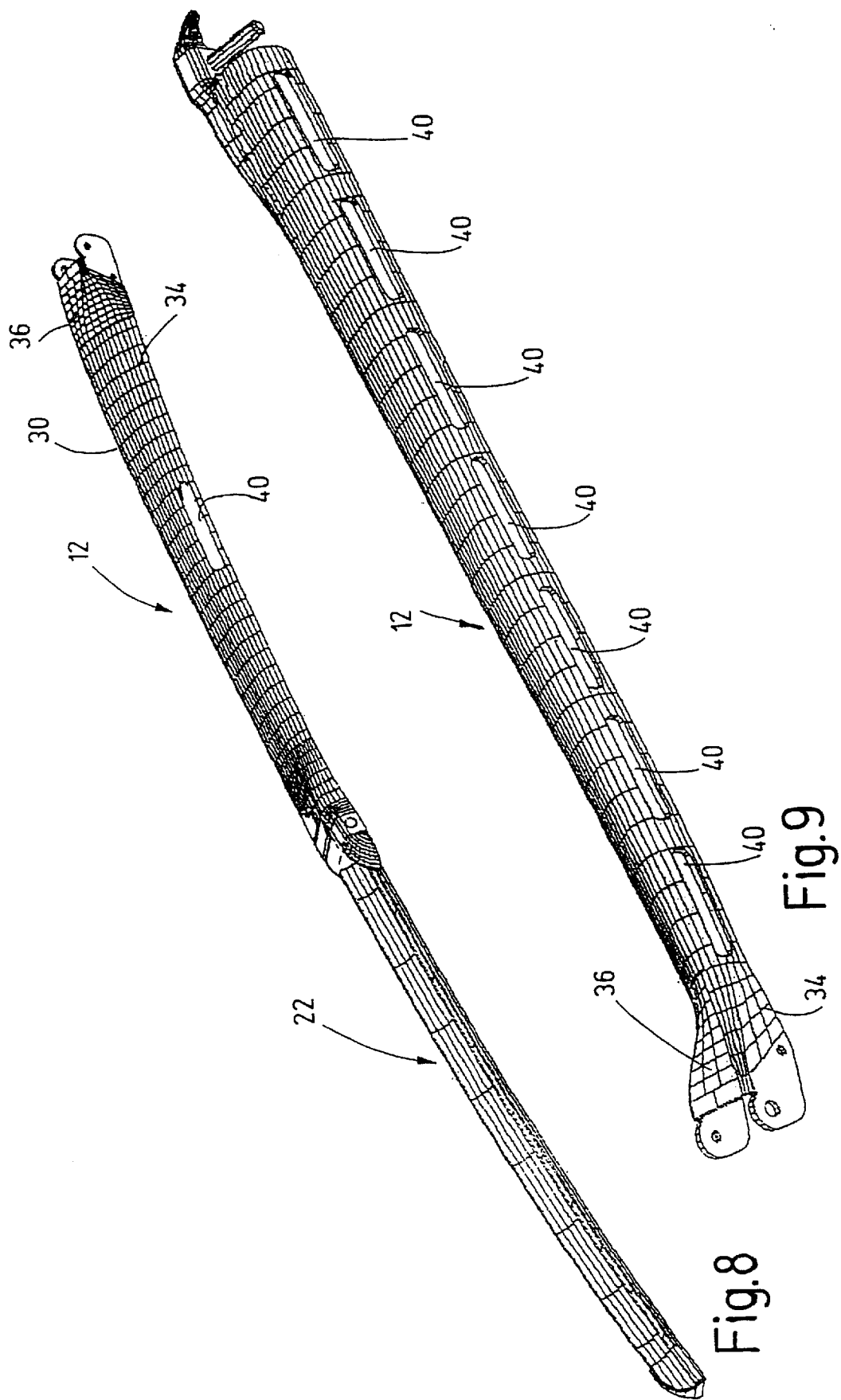

WINDSHIELD WIPER ARM

BACKGROUND OF THE INVENTION

Figure 1:
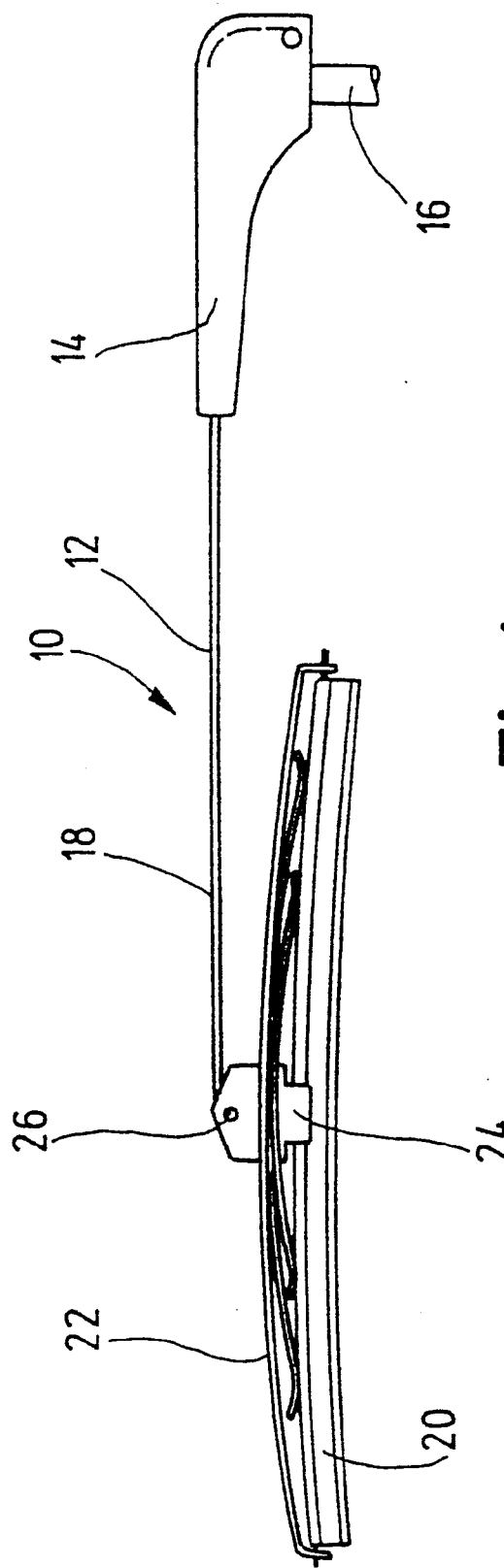

The invention relates to a windshield wiper for a vehicle, in particular a motor vehicle.

Windshield wipers of this generic type are known. Typically, they are used to wipe windows of motor vehicles, to assure clear vision for a vehicle driver. To that end, the windshield wipers have a wiper arm, which can be set into a swiveling or pendulum motion via a wiper drive. The wiper arm is connected by one end to a wiper shaft solidly connected to the body, while the other, free end of the wiper arm carries a wiper blade. With respect to the connection between the wiper blade and the wiper arm, various constructions are known, in which either the wiper blade is pivotably connected to the wiper arm, or the wiper arm has a solidly connected wiper blade that is prestressed in the direction of the window.

Depending on vehicle styling, the windshield wiper is either partly concealed by an extension of a hood over the engine compartment, or the windshield wiper is disposed in plain sight. Especially in windshield wipers that are not concealed, they are subject to a relative wind during an intended use of the motor vehicle. This leads to bothersome wind noise, especially at high speed ranges of the motor vehicle.

SUMMARY OF THE INVENTION

The windshield wiper according to the invention offers the advantage over the prior art that the flow noise is reduced in a simple way. Because a leg pointing substantially in the travel direction of the vehicle forms an integrated spoiler, and at least one air outflow opening is disposed on the further legs, it advantageously becomes possible for the air stream approaching the wiper arm to be diverted over the wiper arm by means of the embodiment as an integrated spoiler. Depending on the specific design of the spoiler, this prevents backpressure on the front side of the wiper arm, so that eddy development at flow edges of the wiper arm, which causes noise, is substantially averted. Furthermore, the embodiment of the integrated spoiler means that the deflection of the air stream generates a contrary force, which forces the wiper arm in the direction of the window to be cleaned, thus generating an additional contact pressure of the wiper blade. Especially at high speeds, this improves the wiping pattern. The at least one air outflow opening on the other legs that is additionally provided, in other words on an upper and/or a rear leg of the wiper arm—in terms of the air approach direction—prevents a buildup of backpressure in the interior of the wiper arm that is surrounded by the U-shaped profiled part. This kind of head pressure would lead to a force component of the wiper arm oriented away from the window to be wiped, so that the additional opening that prevents this head pressure leads to a further improvement in the wiping quality.

In a preferred feature of the invention, it is provided that the leg that forms the integrated spoiler has a spoiler lip of an elastic material, pointing in the direction of the window to be wiped. This advantageously makes it possible to minimize any gap between the window to be wiped and the wiper arm; even if the wiper arm briefly touches the window slightly, the spoiler lip absorbs the impact forces, thus averting damage to the window and/or the wiper arm.

Further preferred features of the invention will become apparent from the other characteristics recited in the dependent claims.

DRAWINGS

The invention will be described in further detail below in exemplary embodiments in conjunction with the associated drawings. Shown are:

FIG. 1, a schematic overview of a windshield wiper;

FIGS. 2–9, schematic perspective views of wiper arms in accordance with different variant embodiments; and FIGS. 10–13, sectional views through a wiper arm, which holds a wiper blade, in various variant embodiments.

DESCRIPTION OF THE EXEMPLARY EMBODIMENTS

FIG. 1, for the sake of clear illustration, shows the basic construction of a windshield wiper 10. The windshield wiper 10 has a wiper arm 12, one end 14 of which is disposed on a wiper shaft 16 in a manner fixed against relative rotation. The other, free end 18 of the wiper arm 12 carries a wiper blade 20. The wiper blade 20 is retained in a retaining bracket 22, which can be connected releasably and pivotably to the end 18 of the wiper arm 12 via a fastening part 24. The pivotable connection is made via a pivot shaft 26, which extends approximately perpendicular to the wiper shaft 16.

FIG. 1 is intended merely to illustrate the basic structure of a windshield wiper 10 clearly. In other exemplary embodiments, the form of the wiper arm 12 can also be selected otherwise. In particular, windshield wipers 10 are known in which the wiper arm 12, over its entire length, forms a substantially U-shaped profiled part, which at least partly grips the wiper blade 22. A U-shaped profiled part of this kind has three legs, of which one leg is disposed substantially in the travel direction, one leg is disposed substantially opposite the travel direction, and a third leg connects the two legs to one another and is disposed substantially above the wiper blade.

Various features of such wiper arms 12 are shown in schematic perspective views and will be described in conjunction with FIGS. 2–9 below. From the perspective views, it becomes clear that the wiper arm 12 includes a U-shaped profiled part 30, a first leg 32 of which is oriented substantially in the travel direction of a motor vehicle when a windshield wiper 10 is contacting a window to be wiped; an opposed, second leg 34 is disposed correspondingly oppositely; and a third leg 36 connects the legs 32 and 34. By means of this U-shaped profiled part 30, a receptacle 38 is formed, the inside of which is engaged at least partly by a wiper blade 22, not shown in FIGS. 2–9. Depending on the variable mode of construction, such as a pivotable connection between the wiper blade 22 and the wiper arm 12 or a non-pivotable connection, the connection point between the wiper arm and the wiper blade has different structural characteristics, but these will not be addressed in detail within the context of the present description. A further result is different lengthwise segments of the wiper blade that are covered by the profiled part 30 of the wiper arm 12.

Only the special features of the wiper arm 12 that are according to the invention will be addressed below. It is provided here that the profiled part 30 has at least one opening 40 on its leg 34 and/or on its leg 36. This at least one opening 40 is disposed on the legs 34 and 36, as applicable, that are not located at the front substantially in the travel direction of the vehicle. FIG. 2 shows a wiper arm 12 with two openings 40 in the leg 34. FIG. 3 shows a wiper arm 12 with three openings 40 in the leg 34, while FIG. 4 shows a wiper arm 12 with five openings 40 in the leg 34. A contour of the openings 40 is adapted here to the course of the legs 34; in other words, the openings 40 can have various contours.

In the exemplary embodiment shown in FIGS. 5 and 7, in addition to the openings 40 in the leg 34, further openings 42 are disposed in the leg 36. An alternative embodiment is shown in FIG. 6, where openings 42 are provided solely in the leg 36.

In FIGS. 8 and 9, exemplary embodiments of so-called high-speed windshield wipers 10 are shown, whose wiper arms 12 are adapted aerodynamically to the wiper blades 22. FIG. 9 again shows an exemplary embodiment in which openings 40 are provided in the leg 34. In the exemplary embodiment shown in FIG. 8, the wiper blade 22 is embodied integrally with the wiper arm 12. Once again, at least one opening 40 is provided here in the region of the leg 34. Because of the aerodynamic design of the wiper arm 12, the legs 34, 36 and 32 merge more or less seamlessly with one another, so that the at least one opening 40 can also be disposed in a transitional region between the legs 34 and 36.

In conjunction with the ensuing drawings 10–13, sectional views are shown through a wiper arm 12 and a wiper blade 22 surrounded by the wiper arm 12. From these illustrations, the advantageous effects of the design according to the invention of the wiper arms 12 will become clear.

Figure 10:
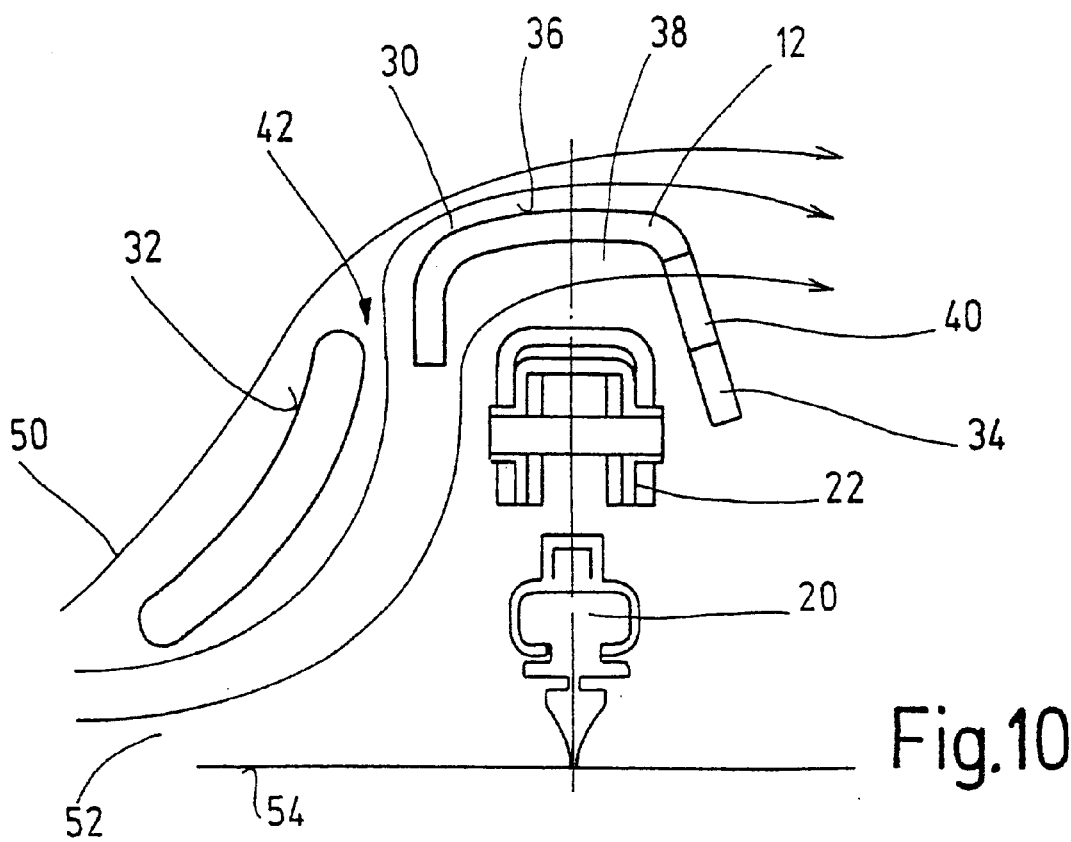

FIG. 10 shows a variant embodiment in which the U-shaped profiled part 30 has openings 40 associated with the rear leg 34 and openings 42 associated with the upper leg 36. From the flow lines 50 shown in schematic form for approaching air, it becomes clear that these lines are partly deflected at the aerodynamically designed form of the leg 32 and are guided over the wiper arm 12. A gap 52 that remains between the U-shaped profiled part 30 and a window 54 also allows some of the air flow to reach the "interior", that is, the receptacle 38 of the profiled part 30. Through the openings 40 and/or 42, this portion of the flow is carried outside from the receptacle 38, so that inside the receptacle 38 no head pressure that would cause the wiper arm 12 to lift away from the window 34 can arise.

Figure 11:
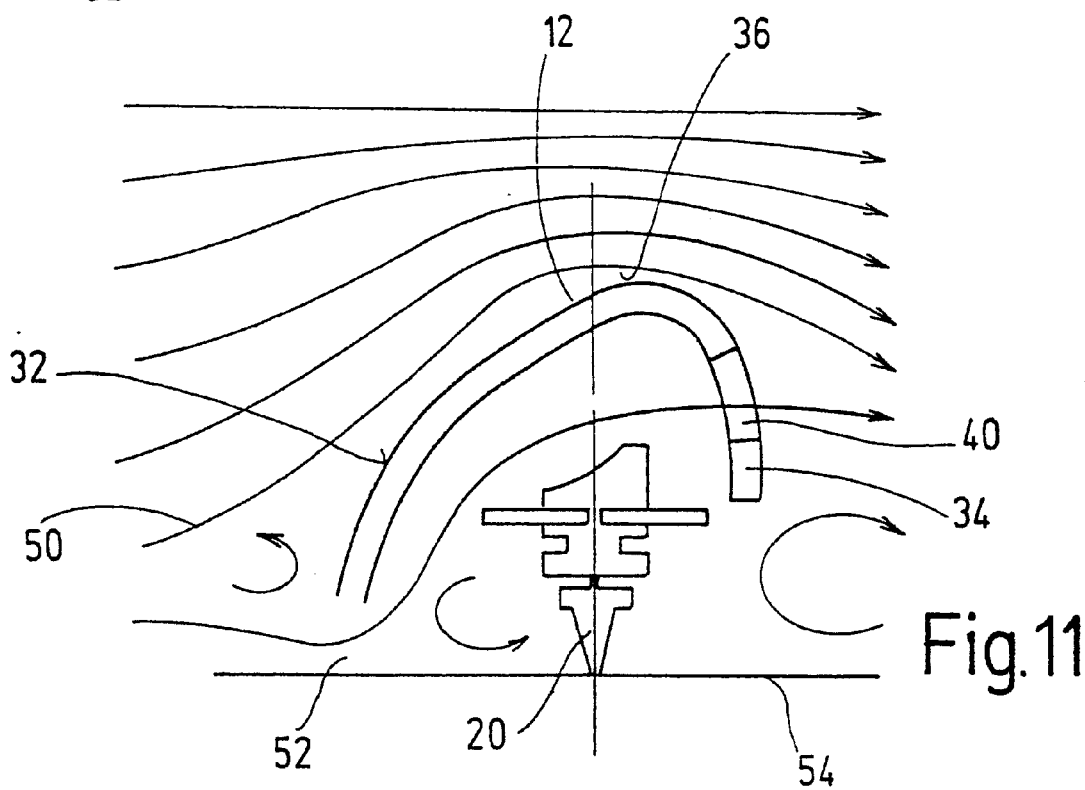
Figure 12:
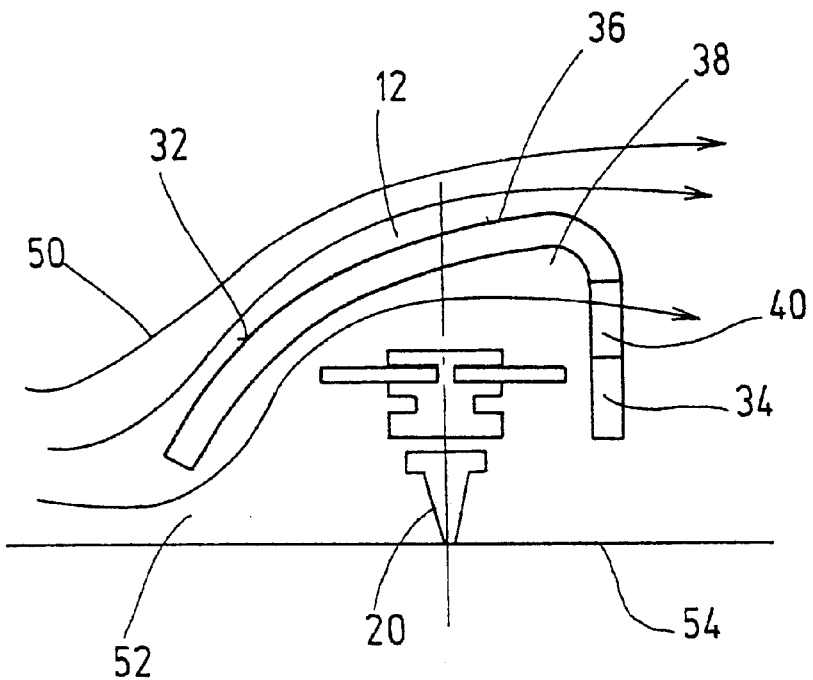

In FIGS. 11 and 12, two variant embodiments are shown in which only one opening 40 is provided, only in the rear leg 34. In contrast to the concave curvature of the leg 32 as shown in FIG. 10, here the legs 32 have a convex curvature, so that corresponding flow lines 50 carry the air flow past the wiper arm 12, and the proportion of the air that reaches the receptacle 38 is carried to the outside through the at least one opening 40 without building up any head pressure.

Figure 13:
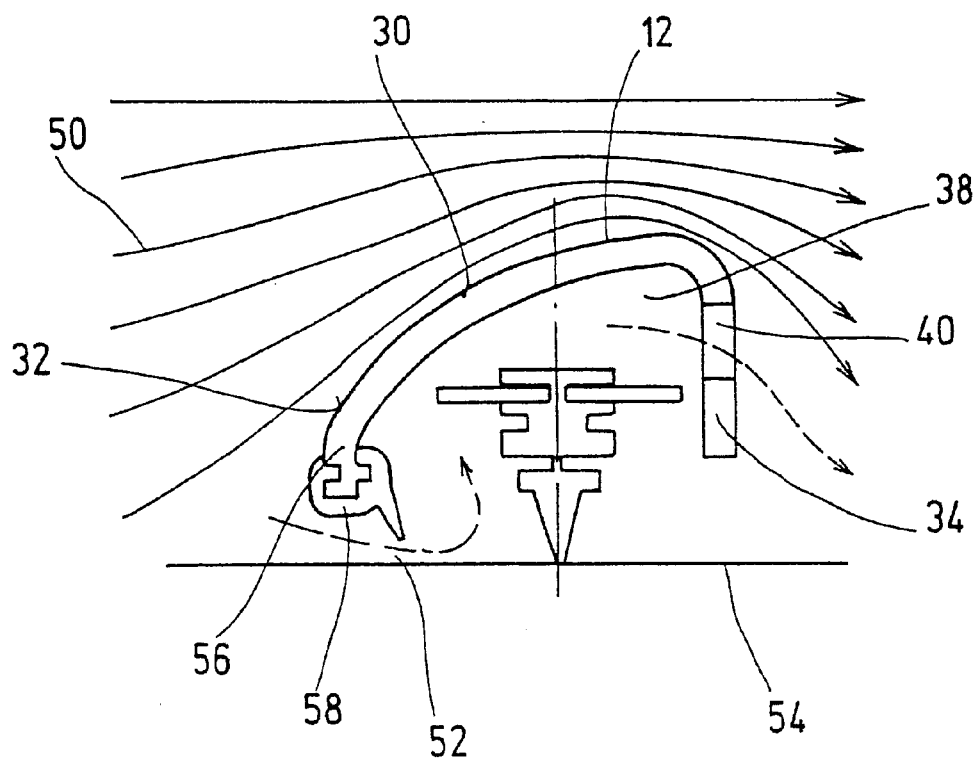

In the variant embodiment shown in FIG. 13, a spoiler lip 58, which comprises an elastic material, such as plastic, rubber or the like, can additionally be provided on the lower end 56 of the leg 32. The spoiler lip 58 leads to a reduction in size of the gap 52 between the window 54 and the retaining arm 12 in the region of the front leg 32 of the U-shaped profiled part 30. As a result, the portion of the air flow 50 that can reach the receptacle 38 of the wiper arm 12 is reduced. At the same time, in a manner known per se, the spoiler lip 58 acts as a guard for the window 54, because the relatively hard material of the profiled part 30 is prevented from striking the window 54 under unfavorable wind conditions or in response to a mechanical imposition of force.

In summary, it becomes clear from the exemplary embodiments shown that a streamlined design is obtained by the embodiment of an integrated spoiler in the wiper arm 12. The openings 40 and/or 42 provided prevent the buildup of a head pressure in the receptacle 38 and thus the buildup of a force component oriented counter to a contact pressure at the window 54. At the same time, the openings 40 and 42 lead to a weight reduction of the wiper arm 12. The disposition of the openings 40 and 42 also provides that in the event of an impact-type load on the wiper arm 12 in the direction of the window 54, the wiper arm 12 is capable of undergoing an elastic and/or plastic deformation, making it possible for the impact energy imposed to be absorbed. The result is that the risk of injury to any persons who might collide with the motor vehicle that has these windshield wipers 10 is reduced. Despite the openings 40 and/or 42 and the elastic or plastic deformation possibilities, the wiper arm 12 is embodied as relatively rigid in the direction of the window 54 in the longitudinal direction of the wiper arm. This assures a constant, high wiping quality.

What is claimed is:

1. A windshield wiper for a motor vehicle, having a drivably supported wiper arm that carries a wiper blade, wherein the wiper arm at least partly surrounds the wiper blade and is formed by a substantially U-shaped profiled part having two legs and a connecting portion, characterized in that one of said legs (32) pointing substantially in a travel direction of the vehicle forms an integrated spoiler, and at least one air outflow opening (40, 42) is disposed in the other of said legs (34, 36), the one leg (32) has a spoiler lip (58) pointing in a direction of the window (54) to be wiped, and the spoiler lip (58) comprises an elastic material, said one leg being free of holes, said other leg being provided with said at least one air outflow opening, and said connecting portion being free of holes.

2. The windshield wiper of claim 1, characterized in that the one leg (32) is embodied in convex fashion.

\* \* \* \* \*